United States Patent [19]

Slusher et al.

[11] Patent Number: 4,672,620

[45] Date of Patent: Jun. 9, 1987

[54] FAST AXIAL FLOW CARBON DIOXIDE LASER

[75] Inventors: Robert B. Slusher, San Jose; Robert E. Wallace, Sunnyvale; John P. Goldsborough, Los Altos; Gary C. Voss, Sunnyvale, all of Calif.

[73] Assignee: Spectra-Physics, Inc., San Jose, Calif.

[21] Appl. No.: 863,632

[22] Filed: May 14, 1986

[51] Int. Cl.$^4$ .............................................. H01S 3/22
[52] U.S. Cl. ...................................... 372/58; 372/92; 372/34; 372/107
[58] Field of Search ...................... 372/58, 55, 61, 65, 372/92, 107, 34

[56] References Cited

FOREIGN PATENT DOCUMENTS 0125682 7/1984 Japan ..................................... 372/58

OTHER PUBLICATIONS

Brunet et al., "Improved Performance of an Electric-Discharge $N_2$-CO Mixing Laser"; Jour. Appl. Phys. vol. 46, No. 7, Jul. 75.

*Primary Examiner*—Leon Scott, Jr.
*Attorney, Agent, or Firm*—Donald C. Feix; Paul Davis; T. M. Freiburger

[57] ABSTRACT

A fast axial flow carbon dioxide laser has a laser head arranged to provide multiple folding of the laser beam into two, four or more linear passes. The construction of the head is such as to provide for generating either one laser beam or a pair of beams, by adjustment of optics. Located centrally in the laser head is a single exhaust manifold for exhausting all of the axially flowing gas from a series of colinear and spaced parallel discharge tubes on opposite sides of the exhaust manifold. Gas flow is from two outer inlet manifolds toward the central exhaust manifold, so that optics of the system are isolated from contamination and from the hot exhaust. Adequate distribution of gas within each discharge tube is assured by the manner in which the flowing gas is directed into the discharge tubes. Special mirror mountings in the laser head provide for a highly stable operation under changing temperatures, primarily due to the use of a graphite fiber/composite tube supporting structure having near-zero longitudinal thermal expansion. For the fold mirrors there is included a mirror alignment and cooling system which provides for easy removal of each mirror for cleaning and replacement, without affecting mirror alignment.

13 Claims, 14 Drawing Figures

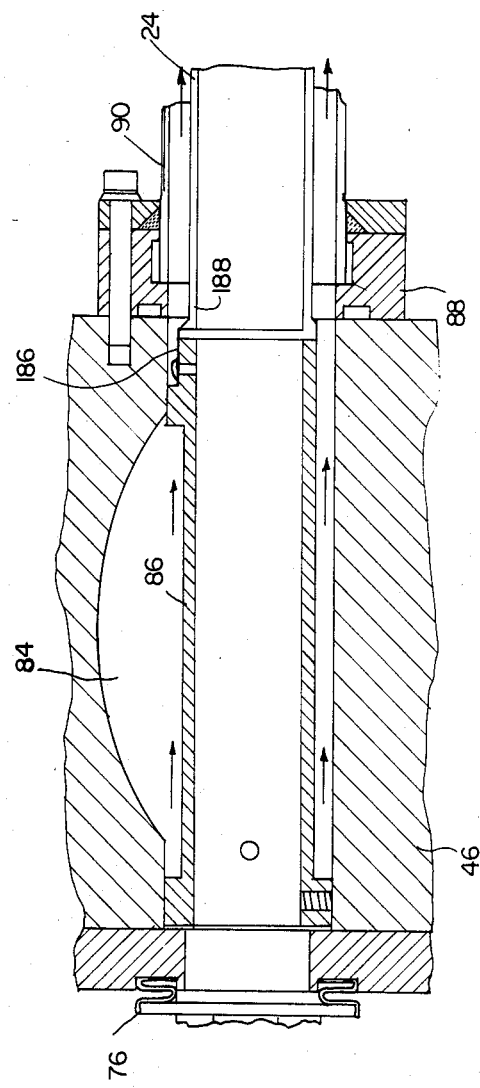

FAST AXIAL FLOW CARBON DIOXIDE LASER

BACKGROUND OF THE INVENTION

The invention relates to lasers, and more particularly to carbon dioxide lasers of the fast axial flow type.

Fast axial flow carbon dioxide lasers are known. Their principal advantage over crossflow type carbon dioxide lasers is greatly increased efficiency, usually about double that of crossflow lasers.

Construction of fast axial flow lasers is generally somewhat more complex than that of the crossflow type, primarily due to the manner in which the flowing gas must be conducted through the discharge tubes.

One problem with fast axial flow carbon dioxide lasers has been the difficulty in creating a uniform distribution of electrical discharge in each tube to avoid gain inhomogeneity and loss of efficiency and power in the laser beam. Prior art systems often resorted to elaborate and complex gas distribution apparatus.

Another problem in the prior art which contributed to loss of efficiency and power was thermal instability in the mounting of the mirrors, particularly with regard to maintaining constancy of mirror separation distances and angular alignment with wide changes in temperature.

Prior art fast axial flow systems usually included a plurality of tees for delivering and receiving exhaust gas from the discharge tubes and for conducting the gas ultimately to a heat exchanger. Gas flow was toward the center, isolating the optics from hot exhaust, but with several tee junctions in succession. Such systems tended to be bulky.

Mirror mounting, particularly where the mirror must be cooled and must be capable of removal for maintenance or replacement, has also been a problem in previous systems.

It is among the objects of the present invention to overcome these problems and shortcomings of the prior art, with an efficient, versatile, sturdy and compact construction of a fast axial flow carbon dioxide laser as described below.

SUMMARY OF THE INVENTION

In the present invention, a fast axial flow carbon dioxide laser includes a laser head with an efficient and relatively simple gas distribution system involving a single, centrally located exhaust manifold receiving hot exhaust from a series of discharge tubes. The tubes are on either side of the exhaust manifold and receive input gas from two input manifolds. A special input port is provided in each discharge tube for the inflow of gas from a surrounding gas inflow tube connected to the input manifold. The port directs gas against the opposite wall of the discharge tube, where it is deflected off the wall and is distributed substantially evenly throughout the cross section of the discharge tube as it flows axially through the discharge portion for optimum laser efficiency and performance.

Discharge tubes extend from both sides of the central exhaust manifold in parallel relationship. Opposite tubes are colinear, so that, for example, eight separate discharge tubes, four on each side of the exhaust manifold, can form four spaced parallel passes of a resonator cavity. Gas flow is from the two outer inlet manifolds toward the central exhaust manifold, so that optics of the system are isolated from the hot exhaust. The exhaust is cooled after leaving the exhaust manifold.

A highly effective mirror stabilization system is included in the preferred embodiment of a laser head in accordance with the invention. Rods or hollow tubes of graphite fiber/resin composite passing through rigid outer tubes provide the sole mirror longitudinal separation control, with near-zero coefficient of thermal expansion for high longitudinal stability under changes of temperature. Special mirror mounting arrangements at the ends of the graphite tubes cooperate to provide initial mirror adjustability without compromising the stabilization system.

In accordance with preferred embodiments of the invention, the series of discharge tubes are arranged for multiple folding of the laser beam in such a way that, by adjustment of mirrors, either a single resonating cavity or two resonating cavities may be defined in the laser head, to produce either a single or two separate laser beams as may be desired under some circumstances of use.

Another preferred feature of the invention is a special mirror mounting and cooling system. Conduction cooling is used to conduct heat away from the mirror substrate through a contacting chiller plate and a spring plunger to a water cooled housing. The special mounting is such that the mirror may be removed for cleaning or servicing, then replaced without affecting mirror alignment.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 shows the interconnection of major components.

FIG. 3 is a longitudinal cross sectional view through a portion of the laser head, showing an input manifold for input of gas to discharge tubes associated with the laser head.

FIG. 10 shows in outline form the relative positions of various components.

DESCRIPTION OF PREFERRED EMBODIMENTS

Figure 1:
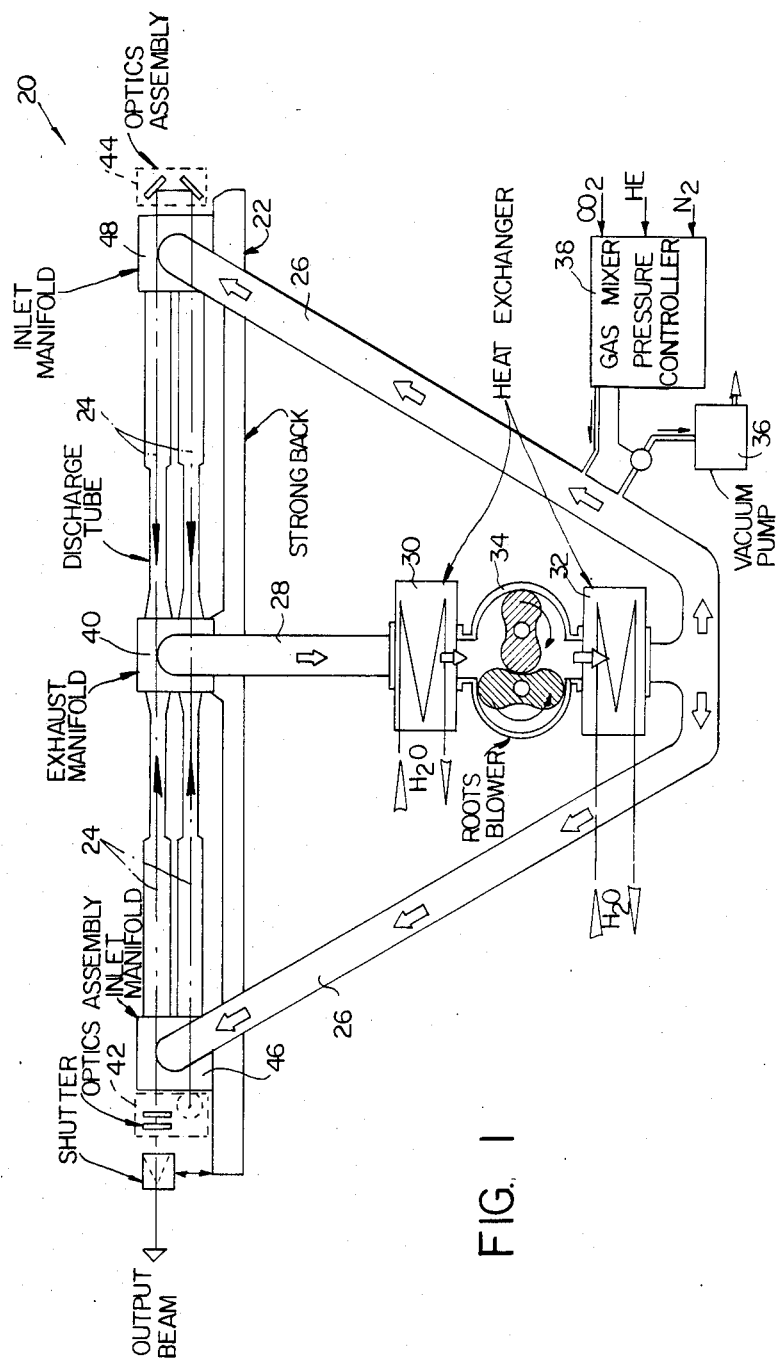
FIG. 1 is an overall system view showing a fast axial flow CO2 laser system constructed in accordance with one embodiment of the present invention.

In the drawings, FIG. 1 shows a fast axial flow carbon dioxide laser 20 including a laser head 22 having a plurality of discharge tubes 24. The laser includes input and exhaust gas conduits 26 and 28, respectively, with flow indicated by arrows in the drawing, heat exchangers 30 and 32 for cooling the exhaust gas from the laser head 22 and blower 34, which is preferably a positive displacement type blower such as a Roots blower as shown, a vacuum pump 36 for evacuating the system to the desired level, and a gas mixer/pressure controller 38, which may have inputs for carbon dioxide, helium and nitrogen as indicated.

As illustrated in FIG. 1, the heat exchangers 30 and 32 are positioned upstream and downstream of the blower 34, respectively. Both heat exchangers preferably include cooling tubes and fins and employ water as the cooling fluid. The first heat exchanger 30 reduces the hot exhaust gas to a safe level for passing through the blower 34, while the second heat exchanger 32 brings the gas down to the temperature desired for recirculated input to the discharge tubes 24.

FIG. 1 also generally indicates the arrangement and operation of the optical cavity associated with the laser head 22. The arrows in the drawing show that the gas flow through the discharge tubes 24 (of which there may be eight, four visible in FIG. 1) is inward toward a centrally located exhaust manifold 40 which connects with the exhaust conduit 28. The exhaust manifold preferably is of metal, such as aluminum.

As has been known in prior fast axial flow lasers, the flow toward center and away from outboard optics assemblies 42 and 44 protects the optics from the hot exhaust gas. This flow is effected with two inlet manifolds 46 and 48, at either end of the laser head 22, receiving input gas through the input conduits 26 and dispersing the gas to the plurality of discharge tubes 24.

In accordance with the invention, only a single exhaust manifold 40 is included in the laser head 22. All discharge tubes 24 lead into a plenum within the manifold 40, from which the exhaust is fed into the exhaust conduit 28. In this way the invention eliminates the need for a bulky network of tee connectors as was common in the prior art.

Figure 6:
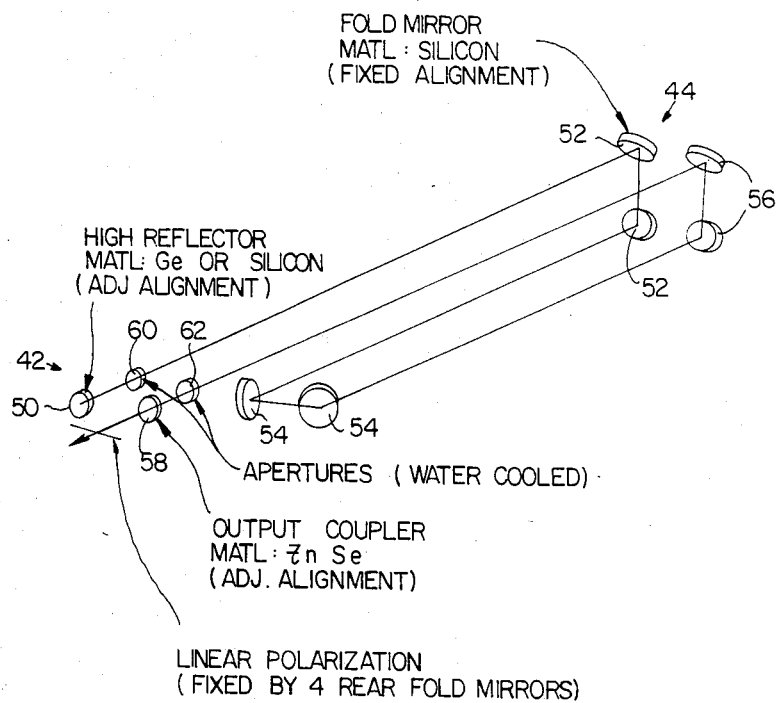
FIG. 6 is an isometric view of an arrangement of mirrors which may be used in accordance with the laser head of the invention.

An optical path for a type of assembly and optical resonator structure shown in the laser head of FIG. 1 is illustrated schematically in FIG. 6. There, it is seen that at one end of the optical cavity is a high reflector or rear mirror 50, which reflects the laser beam off fold mirrors 52 at the opposite end of the laser head, with the beam passing through a pair of aligned, colinear discharge tubes before reaching the fold mirrors 52. The fold mirrors 52 direct the beam (and receive the beam from) another pair of fold mirrors 54 which lie in a different folding plane as illustrated in FIG. 6, again with a pair of aligned discharged tubes lying between these two pairs of fold mirrors.

Another pair of fold mirrors 56, again at the opposite end of the laser head and ajacent to the fold mirrors 52, receive the beam after it passes through more discharge tubes and redirect the beam to an output coupler 58.

The assembly preferably includes a pair of water cooled apertures 60 and 62 which, as is known in this art, keep the beam in the desired $TEM_{00}$ operating mode.

As can be envisioned from FIG. 6, two or more optical resonator cavities (of shorter length) could be formed involving the same eight discharge tubes of FIG. 1. For example, the fold mirrors 52 and 56 could be realigned to fold the beam through only two passes between the high reflector 50 and the output coupler 58, and another two-pass cavity could be formed in the plane below by proper aim of fold mirrors and replacement of two fold mirrors with an end reflector and an output coupler.

Figure 2A:
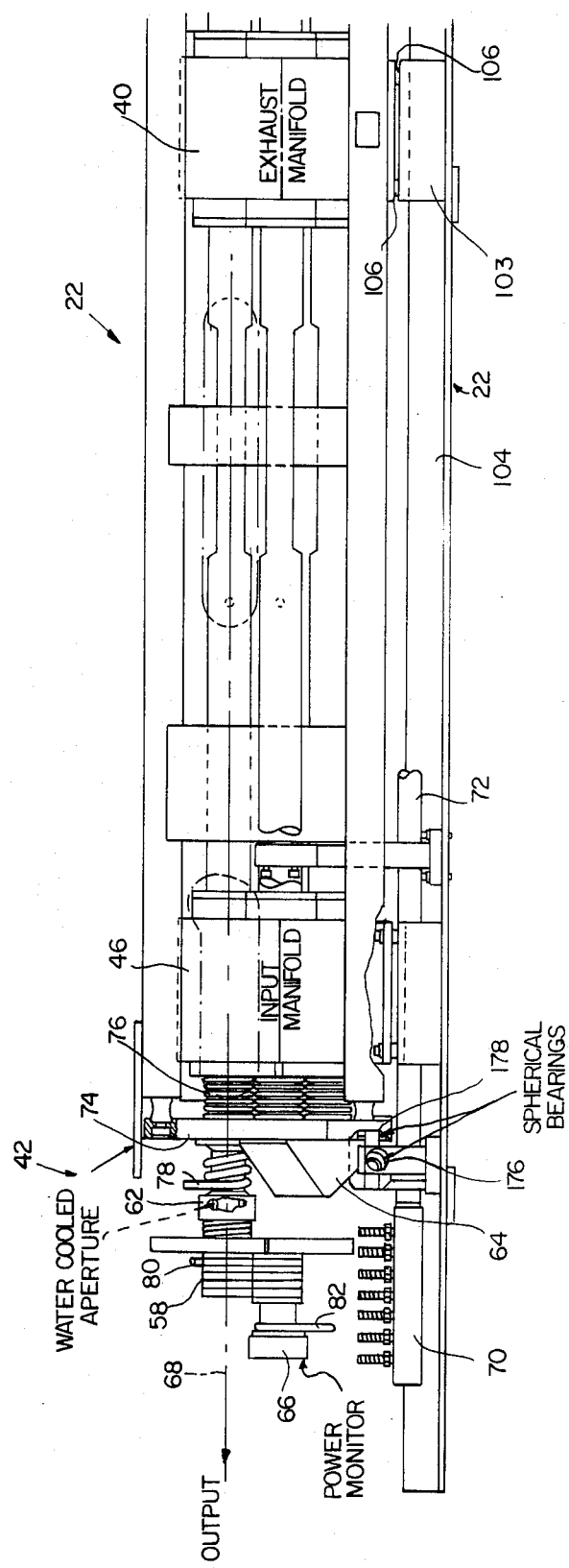
FIGS. 2a and 2b are elevation views showing details of a laser head of the laser system of FIG. 1.
Figure 2B:
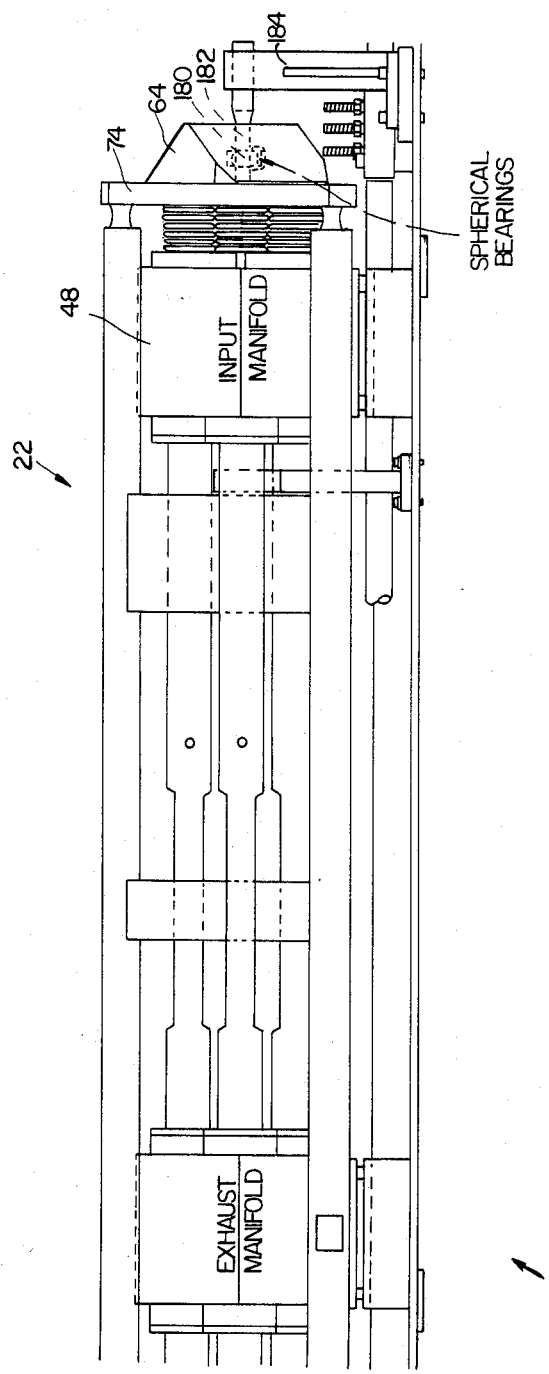

FIG. 2 shows the configuration of the laser head 22 in greater detail. FIG. 2 shows a preferred construction in accordance with the invention, which achieves a high degree of stability in optics, versatility in operation and ease of maintenance, in a relatively simple assembly.

At the left end of the laser head 22 as seen in FIG. 2 is the optics assembly 42, which includes the output coupler 58, the fold mirrors 54 within a mirror housing 64 (mirrors not seen in FIG. 2), the water cooled apertures, with the housing of the aperture 62 being seen in FIG. 2, the high reflector mirror 50 (not seen in FIG. 2), and a power monitor 66, from which the output power of the laser beam 68 can be monitored.

Also at the left or output end of the laser head 22 as seen in FIG. 2 is the input gas manifold 46, a cooling water manifold 70 for receiving water from a cooling water conduit 72, and an end mirror mounting plate 74 connected to a special mirror stabilization system in accordance with the invention, described further below. Also seen are flexible couplings 76 with seals, connecting the input manifold 46 to the mirror mounting plate 74 along the passes of the optical cavity. Water cooling coils are shown at 78, 80 and 82.

Figure 4:
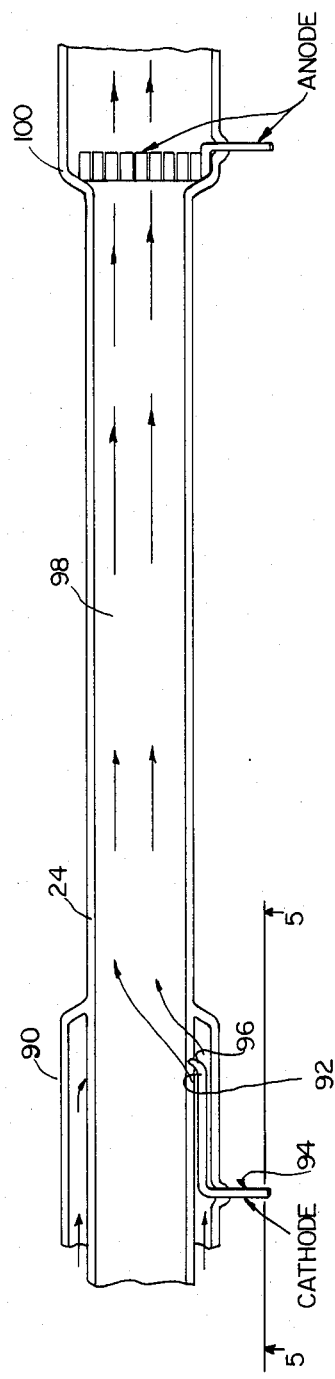
FIG. 4 is another detailed cross sectional view, showing the input of gas to the discharge area in one of the tubes.
Figure 5:
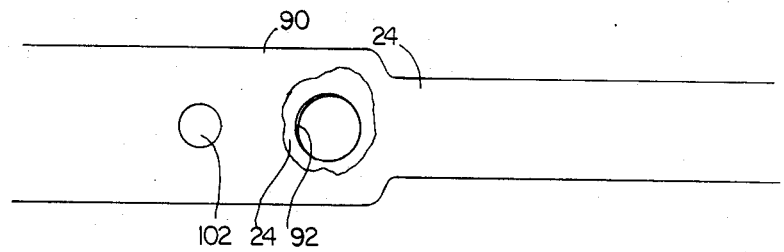
FIG. 5 is a view from the side of one of the discharge tubes with an outer gas inflow tube connected in surrounding relationship to the discharge tube, and showing an input port for gas flow into the discharge tube.

FIGS. 3, 4 and 5 show some details of the input manifold and the manner in which the gas is input from the manifold to each discharge tube, and the positioning of a cathode and anode within the discharge tube.

As shown in FIG. 3, a longitudinal cross-sectional view through the intake manifold 46, intake gas within a plenum or generally annular space 84, having entered through the input conduit 26 (FIG. 1), moves to the right as seen in FIG. 3. The input gas surrounds an input nozzle 86, about which the flow is coaxially diverted, and moves through a connecting collar 88 and into an outer envelope or outer gas inflow tube 90 surrounding a portion of the discharge tube 24.

As shown in FIG. 4, the gas advances through the outer gas inflow tube 90 and through a port 92 formed in one side of the discharge tube 24. Both the discharge tube 24 and the outer gas inflow tube or envelope 90 preferably are of glass, while the input nozzle 86 within the input manifold 46 may be of metal.

The gas entering the port 92 passes around, in surrounding relationship, a cathode 94 as indicated in FIG. 4. The cathode 94 is shown having a tip 96 protruding into or nearly into the port 92 in the wall of the discharge tube, but this is not essential and it is sufficient that the cathode 94 be in the path of the gas as it travels from the enshrouding tube 90 toward and into the port 92.

The fast flowing gas then flows axially through a discharge area 98 of the discharge tube and past an anode 100, which may be located at a point where the discharge tube increases in diameter as shown in FIG. 4. After the gas passes by the anode 100, it is conducted into the exhaust manifold 40 (FIG. 1).

FIG. 5 shows, somewhat schematically, the gas input side of the tube 24, 90 assembly, indicating a small opening 102 in the outer wall of the outer gas inflow tube for the entry of the cathode, and the gas port 92 itself in the wall of the discharge tube 24, with a portion of the outer wall 90 broken away in the drawing to reveal the port. The cathode may be sealed into the opening 102 by epoxy or other appropriate sealant for an effective vacuum seal.

The gas porting arrangement as shown and described is effective to cause turbulence upon entry to the discharge tube and to distribute the electrical discharge substantially evenly throughout the cross-section of the discharge tube as the gas proceeds axially through the tube.

The gas flows in the inlet port 92 from the outer tube envelope 90 at a high injection velocity. On its way to the port, the gas makes electrical contact with the cathode 94. The cathode is cooled by the inlet gas. As the gas is injected through the port it is forced at high velocity against the opposite wall of the discharge tube, causing a very high turbulence that helps to disperse the electrons and produces good electron diffusion in the discharge tube.

Without good electron diffusion the discharge would become unstable, tending to collapse or to become filamentary. As a discharge collapses, the gas is heated up and the impedence of the gas is reduced through a small area, causing further collapse and arcing. This overheating of a very small portion of the gas tends to prevent optical gain and the needed population inversion for lasing.

An input port 92 of about $\frac{3}{8}$ inch diameter has been found effective for producing the desired turbulence, in a discharge tube of approximately one inch inside diameter, in a carbon dioxide laser wherein the volumetric flow rate in each tube is about 200 cubic feet per minute at about 100 millibars average pressure.

As mentioned above, the blower 34 (FIG. 1) is a positive displacement type blower, and it may be a Roots type blower as indicated, to produce the relatively high pressure and flow that is needed in this fast axial flow type carbon dioxide laser. The laser can require flow of around 1,000 cubic feet per minute and the Roots blower will produce a definite volume displacement for each revolution.

The Roots blower is only one example of the type of blower which is adequate for this purpose. For example, a regenerative blower of adequate size can be used, provided leaking back of gas can be held to a minimum.

As discussed above, the exhaust manifold 40 of the laser head of the invention is located centrally in the laser head, providing a single plenum into which all discharge tube exhaust flows for exiting the laser head. The exhaust manifold may be actively cooled, for example, by a chiller plate (not shown) in heat conducting contact with the manifold, to limit temperature rise. As shown in FIG. 2, the manifold 40 is secured to a central base member 103 of a rigid frame or "strong back" 104 supporting the laser head, and there preferably is included a thermal barrier between the exhaust manifold and the base member 103, comprising, for example, stainless steel standoffs 106.

The water cooled apertures 60 and 62, of which the aperture 62 is visible in FIG. 2, are well known in the art for use in preventing the laser from going multimode, i.e. going to higher order transverse modes. The apertures produce diffraction loss for higher order modes, tending to keep the laser in the single, $TEM_{00}$ mode.

The water cooled aperture assemblies 60 and 62 comprise reflective copper conical surfaces (not shown) which reflect light incident on them into an absorbing oxide coating on the inside of the water cooled aperture housing.

The six beam folding mirrors shown in FIG. 6, i.e. the mirror pairs 52, 54 and 56, fold the beam through the path of all the eight discharge tubes 24, to define a multiply-folded optical cavity between the high reflector 50 and the output coupler 58.

The output coupler mirror may be of zinc selenide, and the high reflector may be of germanium or silicon. Germanium with the proper dielectric coating will allow some power to leak through the mirror, which is desirable in this instance for power monitoring through the power monitor 66 shown in FIG. 2.

Figure 9:
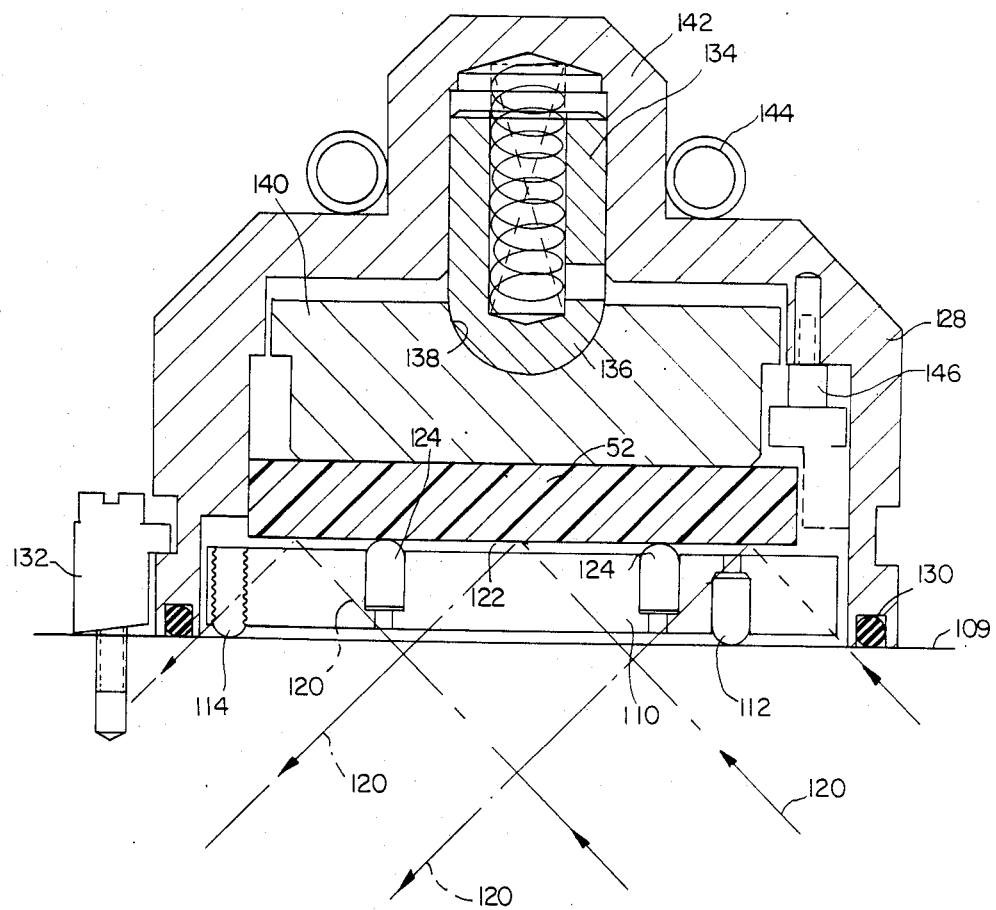
FIG. 9 is a detailed sectional view showing a mirror mounting at one end of the laser head assembly, with means for cooling the mirror.
Figure 10:
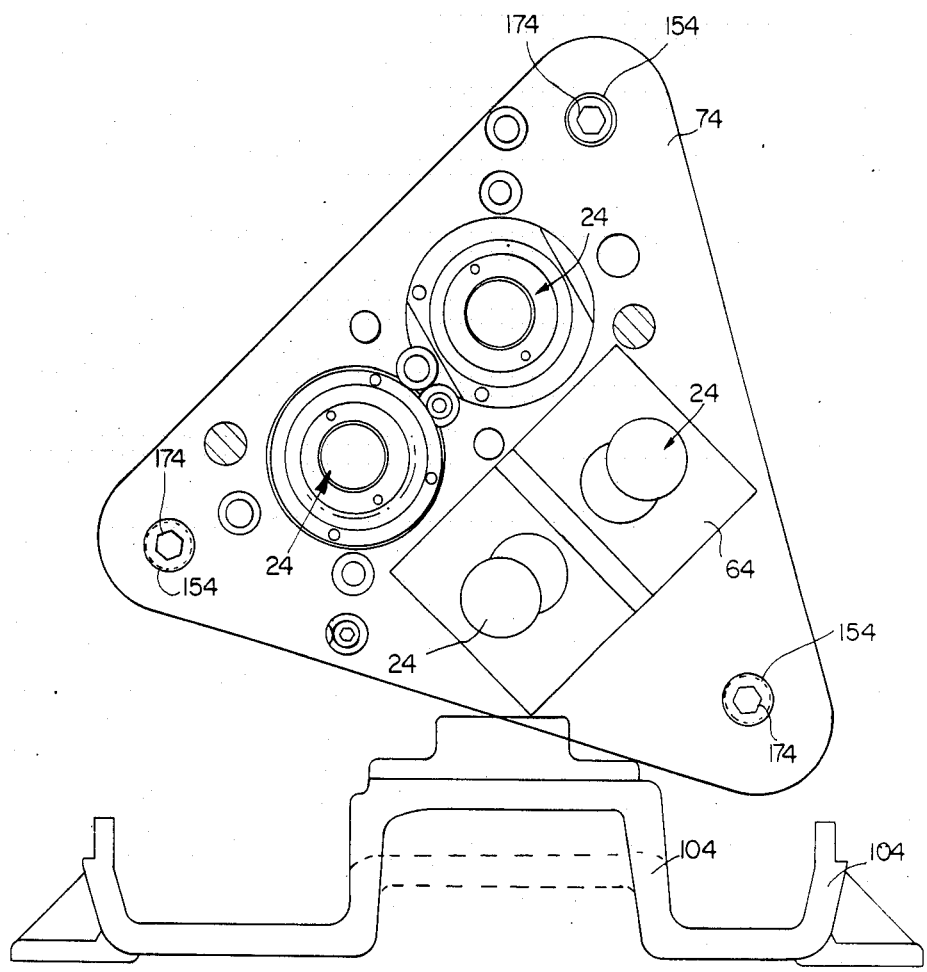
FIG. 10 is a somewhat schematic transverse sectional view of the front mirror mount assembly of the laser head.
Figure 12:
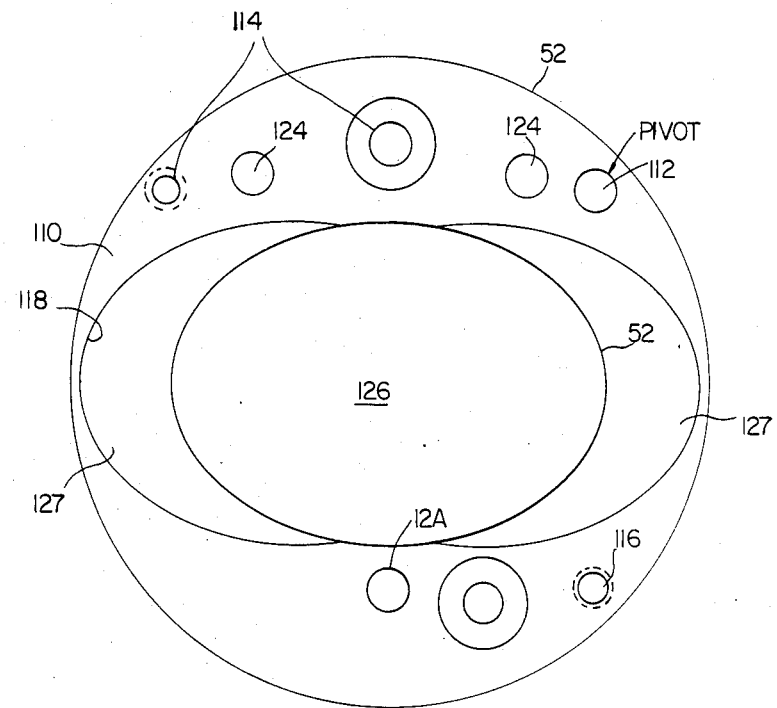
FIG. 12 is a detailed view showing the manner in which a mirror is retained in position on a mirror mount in accordance with the invention.

The fold mirrors 52, 54 and 56 preferably are of silicon, each with a coated area defining the mirror surface and an outer area of uncoated silicon substrate. FIGS. 9, 10 and 12 illustrate some of the important features of the fold mirror mounting arrangement in accordance with the present invention.

One important feature of the mirror mounting of the invention is the ability to remove a fold mirror, such as for cleaning, and to replace it again on the supporting structure without losing optical alignment. If necessary a different mirror may be placed in the position of the removed mirror, without losing optical alignment.

FIG. 9 shows the surface of a fold mirror mounting plate 109 which may be of aluminum. The plate 109 is attached to structure which is ultimately connected to the mirror mounting plate 74 and the mirror stabilization system, indicated in FIG. 2 and discussed further below. The plate 109 may be a shaped block attached to the plate 74, or may actually be a shaped portion integral with the plate 74.

The mirror mounting structure shown in FIG. 9 is mounted on the mirror mounting plate 74 shown in FIG. 2. The mirror mounting structure described with reference to FIG. 9 is not shown in FIG. 2.

As shown in FIG. 9, an alignment plate 110 is supported on the mounting plate 109, being properly positioned against the mounting plate via what amounts to an orthogonal three point suspension. One of the three points is a pivot pin 112, permanently fixed into the alignment plate 110 as shown, and the other two are adjustment screws 114 and 116.

Figure 13:
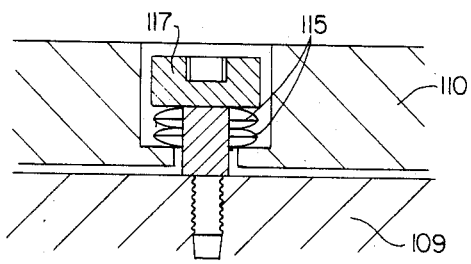
FIG. 13 is a detailed view in section showing a connection between two elements of the fold mirror mounting system.

As shown in FIG. 13, the alignment plate 110 is held against mounting plate 109 by the force produced by spring washers 115 which are retained by shoulder bolts 117 which screw into the plate 109. The spring washers are recessed in two counter bored holes in the plate 110.

FIG. 12 shows better the orientation of these adjustment screws and the pivot pin 112. The two adjustment screws can be adjusted to tilt the alignment plate 110 about two different axes, providing all desired adjustability. FIG. 12 also shows that the alignment plate 110 includes a large central opening 118, preferably eliptical or oval as shown, through which the laser beam (indicated by lines and arrows 120 in FIG. 9) can enter and be redirected off the surface 122 of the mirror, identified as one of the mirrors, for example, in FIG. 9.

The mirror 52 is itself held in properly aligned position by three additional pins 124, indicated in FIGS. 9 and 12. These pins are positioned not orthogonally but preferably in an isosceles triangular configuration as shown in FIG. 12. The pins 124 are non-adjustable, permanently secured in the alignment plate 110 to support the mirror in proper alignment (as set by the alignment plate adjustment screws 114, 116), regardless of removal and replacement of the mirror 52, or even replacement of the mirror with a different mirror. The mirrors are formed flat to a sufficiently precise specification that mirrors can be interchanged and will be properly aligned when engaged against the three permanent alignment pins 124 shown in these figures.

FIG. 12 indicates that only a central portion 126 of the mirror body 52 is coated with the reflective coating, the remaining area outside the coated area 126 being bare (silicon) substrate 127, and that is the area that bears against the three permanent alignment pins 124. This prevents chipping of the mirror coating by the pins and subsequent misalignment.

The outer periphery of the mirror 52 substrate is shown in dashed lines in FIG. 12.

The mirror 52 must be within a vacuum sealed environment, and this is accomplished with a cover or housing 128, which may be of copper, sealed against the surface of the mirror mounting plate 109 by an 0-ring 130 as illustrated. Clamps 132 around the periphery of the cover or housing 128 engage the housing in sealed relationship with the surface 109.

Within the cover, a spring-biased plunger 134 is engaged with its hemispherical end 136 in a complementarily shaped recess 138 of a chiller plate 140. Flexible thermally conductive material is interposed between the surfaces 136 and 138 and the hemispherical engagement allows this spring-biased plunger to exert a "floating" pressure against the plate 140 and the mirror 52, to accommodate adjustments in the mirror angle.

The chiller plate is in thermally conducting engagement against the back of the mirror 52, and there preferably is included between these surfaces some thermally conductive flexible material to assure intimate thermally conducting contact between the plate 140 and the mirror 52, so that the heat of the mirror is carried away into the chiller plate 140. From there, the heat is conducted into the plunger 134, and from there into a head portion 142 of the cover or housing 128. A cooling coil 144 is disposed on the outside of the cover 128, as indicated in FIG. 9, for ultimately drawing away the mirror heat.

In this way, the need for water fittings inside the laser vacuum chamber is avoided, with the optics very efficiently cooled externally.

If there is a need to remove the mirror 52, as for cleaning, the entire outer cover or housing 128 is removable from the mirror mounting plate 109, and as stated above, the assembly may be replaced after cleaning without having to realign it. The chiller plate 140 is captivated inside the vacuum housing 128 by several shoulder bolts 146, one of which is seen in FIG. 9. Removal of the vacuum housing or cover 128 has the effect of pushing the mirror 52 part way out of the housing, via the spring plunger 134, and the shoulder bolts 146 keep the mirror and chiller plate from escaping while the plunger moves the mirror surface toward the outside of the housing, giving more convenient access for cleaning. The mirror 52 remains in contact with the chiller plate 140 due to adhesion of the heat-conducting material.

Figure 7:
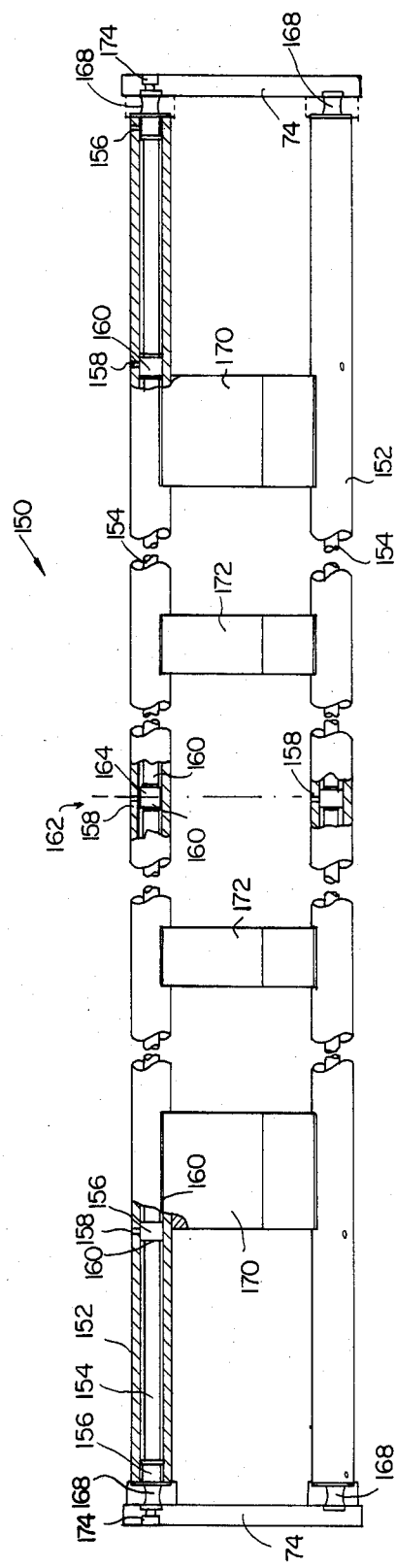
FIG. 7 is a longitudinal elevation view showing a mirror stabilization system constructed in accordance with one aspect of the invention and utilizing thermally stable graphite fiber/resin composite tubes.

FIGS. 2, 7, 8 and 10 show the construction of a mirror stabilization system or resonator spacer support structure 150 which forms an important feature of the invention. The support structure 150, as best seen in FIG. 7, includes outer rigid tubes 152, which may be of aluminum and three in number. Within each rigid tube is an inner member, preferably a tube, of a graphite fiber/resin composite 154 in which a majority of the fibers run lengthwise to the tube. This results in an extremely low thermal expansion coefficient along the longitudinal axis.

As discussed above, this provides for near-zero expansion of the resonator cavity in the longitudinal direction, with changes in temperature of the assembly.

The graphite/resin composite tubes 154 are supported within the outer rigid tubes 152 by a resilient mounting arrangement. This may comprise, as shown in FIGS. 7 and 8, injections of silicone bonding material 156 at several locations—e.g. in each rigid tube 152 at locations as shown in FIG. 7, near both ends and periodically along the length of the resonator spacer support structure assembly.

Figure 8:
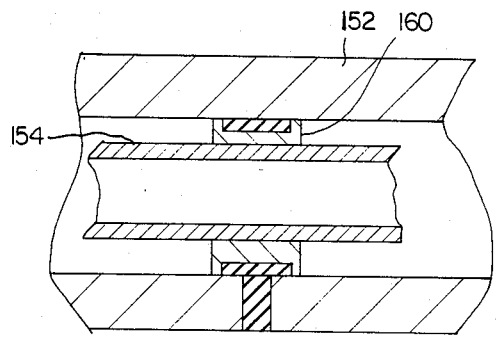
FIG. 8 is a detailed view showing a feature of the mirror stabilization system for centering the graphite fiber/resin composite tubes in outer rigid tubes.

The silicone elastomer material 156 is injected through bores 158 in the outer rigid tubes 152 as shown in FIG. 7 and FIG. 8, to form resilient rings around the resin/composite tubes. There is preferably included, at each bore 158 location, a recessed ring 160, providing a substantially closed space within which to contain the elastomeric material 156.

At the center of the resonator, identified as 162 in FIG. 7, the elastomer is not used, but rather a high-strength epoxy 164 is injected through a bore 158 to bond the inner composite tube 154 to the outer rigid tube 152. The ring 160 is positioned to form a substantially closed space for receipt of the epoxy 164. Therefore, at the center of the resonator assembly, even as the assembly heats up, the inner composite tubes 154 will be bonded to the outer rigid tubes 152 so that expansion of the rigid tubes relative to the inner composite tubes will occur in both directions away from the center. As the expansion of the rigid tubes 152 proceeds, there is relative movement between the inner and outer tubes at the locations of the injected elastomer material 156.

In the assembly of the resonator spacer support structure 150, first the graphite fiber/resin composite inner tubes 154 are fitted with the spacer rings 160, as by gluing these spacer rings in the correct positions to the composite tubes. Next, end fittings 168 are affixed to the composite tubes on both ends, and this may again be accomplished by gluing, and use of a fixture to obtain the proper overall length.

Figure 11:
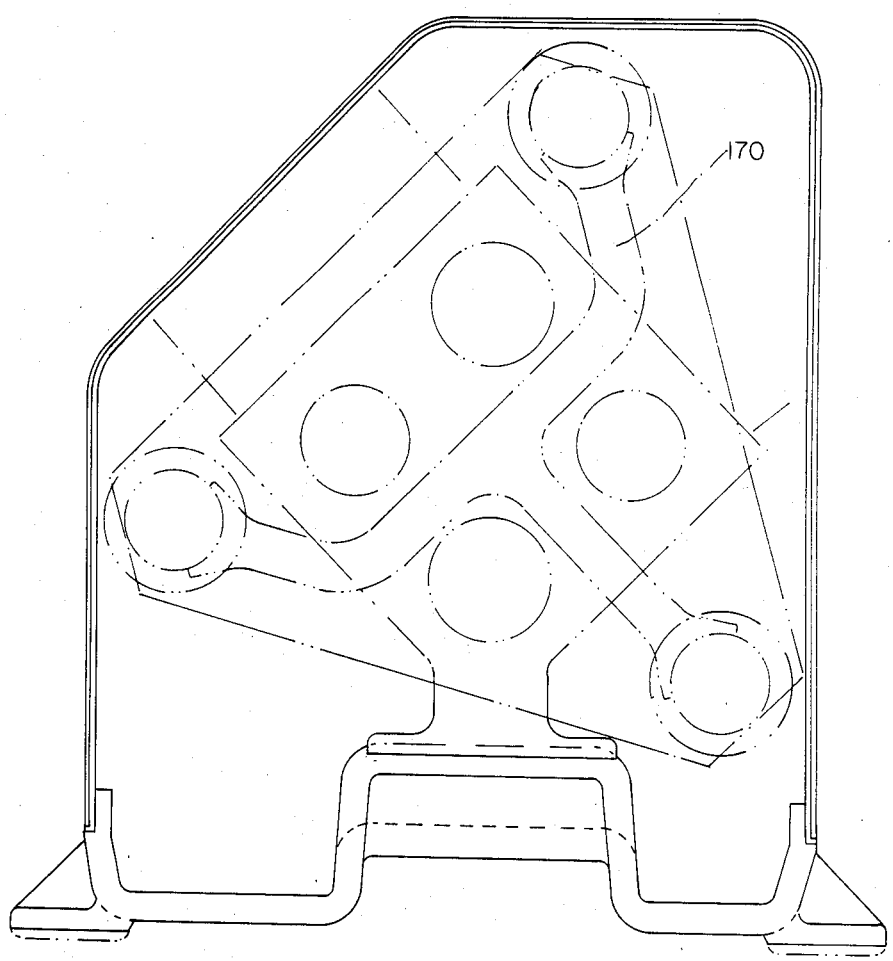
FIG. 11 is a view somewhat similar to FIG. 10 showing the rear mirror mount arrangement in similar transverse cross-sectional view.

The next step is to slide each composite tube into the corresponding outer rigid tube 152, with all the rigid tubes 152 held together in fixed orientation and against torsion by rigid spacer members 170 and 172, as shown in FIGS. 7 and 11. With the inner composite tubes 154 installed and correctly positioned in the outer tubes 152, the epoxy material 164 is first injected, through the access holes 158 at the center of the resonator assembly, to fix or pin the composite tubes 154 to the outer rigid tubes 152 at the center of the resonator assembly. The epoxy is allowed to harden, then the elastomer 156 is injected at the locations indicated in FIG. 7, spaced outwardly from the center of the assembly.

Three holes 158 may be provided at each location for the elastomer, with the elastomer injected in one hole until it fills the cavity formed by the spacer rings 160 and until elastomer starts to push through the other two holes. The excess is wiped out of the holes and the holes are covered, as by taping.

Upon thermal expansion of the outer rigid tubes 152, the relative movement between the outer tubes and the inner composite tubes 154 is only on the order of a few thousandths of an inch. The elastomer is quite flexible, so there is no significant shear effect where the elastomer extends into the access holes 158.

Each of the end fittings 168 is drilled and tapped so that a screw may be inserted into the end of it, such as the screws 174 indicated in FIG. 7. The screws are used to maintain the mirror mounting plates 74 (see also FIG. 2) in place, thereby connecting them to the thermally stable composite tubes 154. The end fittings 168 may be of stainless steel.

With the resonator spacer support structure or mirror stabilization system 150 shown in FIG. 7, the cavity length is stabilized by virtue of the graphite fiber/resin composite tubes 154 which have near-zero coefficient of thermal expansion. These length-stable tubes work in conjunction with the outer rigid tubes 152, which may be aluminum, and the rigid spacer structures 170 and 172, both of which provide torsional and flexural stability.

All of this is connected to the frame or "strong back" 104 (FIG. 2). The entire resonator spacer support structure may be considered as supported by the mirror mount plates 74 at the ends. As stated above, the graphite/composite tubes 154 are bolted to the mirror mount plates 74. These length-stable tubes do not engage anything else at their ends other than the mirror mount plates.

The mirror mount plates 74, in turn, are connected to the strong back 104 by spherical bearings 176, 178 and 180, as indicated in FIG. 2. In the case of the rear (or right-hand, as viewed in FIG. 2) mirror mount, the spherical bearing 180 is actually imbedded in the rear mirror mount assembly. A rigid shaft 182 projects from a base frame 184 of the strong back into the mirror mount, to engage an inner race of the spherical bearing 180. The inner race is allowed to slide on the shaft 182. As the strong back expands and contracts with temperature, the spherical bearing joint 180 will have relative sliding movement, preventing any stresses from being applied to the resonator structure with respect to longitudinal movement.

At the front of the assembly, or the left hand side as viewed in FIG. 2, the two spherical bearings 176 and 178 secure the mirror mount to the strong back along two axes. The front spherical bearing 178 is similar to the rear bearing 180, i.e. providing for relative sliding movement in the longitudinal direction. The connection 178 allows such relative longitudinal movement while still providing a relatively rigid connection with respect to twisting or bending at that location. The addition of the spherical bearing 176 prevents torsion of the assembly, so that the assembly cannot rotate with respect to one end.

In this way, the front and rear mounting plates 74 are maintained at a very constant angle relative to each other.

Another important feature of construction of the laser head resonator assembly shown in the drawings is illustrated particularly in FIG. 3. A spring finger 186 is secured to the rigid metal input nozzle 86 and has a depending end projection 188 to help in the alignment of the discharge tubes 24 with respect to the input nozzles 86 upon assembly. When each discharge tube 24 is inserted through the collar 88 to engage with the input nozzle 86, the spring finger or spring clip 186 will springingly retract under the force of the end of the discharge tube, to engage the glass discharge tube 24 in the proper position. The result is that the tube 24 is easily lined up properly with the input nozzle 86.

The positions of the inlet manifolds 46,48 and exhaust manifold 40 are precisely fixed by accurate machining of the strongback assembly 104. This provides for accurate optical axis 44 alignment of the resonator relative to the discharge tubes 24 without resorting to a tedious manual alignment as required in prior art fast axial flow lasers.

The importance of the spring clips 186 as maintaining alignment lies in the fact that the outer tube 90 around the discharge tube 24 often is not perfectly concentric, due to imperfections in the glass blowing process. The connection device of the invention lines up the inner glass tube 24, which is the important tube for alignment, without reference to the engagement of the outer tube 90 with the collar 88.

FIG. 10 shows the front mirror mount with the front mirror mount plate 74, the principal element seen in this view. A portion of the "strong back" frame 104 is seen supporting the assembly, attached, as mentioned above with reference to FIG. 2, to the front mirror mount plate 74 by the spherical bearings 176 and 178. The mirror mount plate 74, which may be triangular as shown, is connected to the three composite tubes 54 by the bolts or screws 174, the heads of which are seen in FIG. 10 and which were discussed above in relation to FIG. 7.

FIG. 10 also shows the center line locations of each of the discharge tubes 24, preferably in a generally square cross-sectional arrangement as indicated.

Other features of the laser head construction not shown in FIG. 10 include a pair of stepper motors. The stepper motors are for making fine tuning adjustments in the tilt of the high reflector and output coupler mirrors while the laser is operating.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A laser head for a carbon dioxide laser of the fast axial flow type, comprising;
   a plurality of gas discharge tubes in parallel relationship, with some tubes in coaxially aligned pairs and some spaced apart and parallel,
   a single exhaust manifold located generally centrally in the laser head, with the discharge tubes connected in opposed relationship at opposite sides of the exhaust manifold, two input manifolds, one at either end of the laser head, with discharge tubes positioned between the input manifolds and the exhaust manifold and with some of the discharge tubes connected to one input manifold and the remaining discharge tubes connected to the other input, manifold, each discharge tube having an outer, larger-diameter enshrouding gas inlet envelope over a portion of the discharge tube and connected into an input manifold and including means for admitting inlet gas from the input manifold and the enshrouding envelope into the discharge tube to effect substantially even distribution of gas throughout the discharge tube during its axial flow therethrough, a plurality of mirrors at opposite ends of the laser head positioned to define a resonator cavity among the discharge tubes and to fold a laser beam through spaced parallel passes through aligned pairs of discharge tubes, resonator cavity stabilization means connected to the mirrors for securing the mirrors despite changes in temperature, a plurality of cathodes near the input port of each discharge tube, and a plurality of anodes at the downstream end of each discharge tube and toward the exhaust manifold end of each discharge tube.

2. A laser head according to claim 1, wherein each discharge tube includes, near its upstream end, an inlet gas port in its wall, positioned to receive the inlet gas from the input manifold and the enshrouding envelope and to deliver it at high velocity against the discharge tube wall opposite the inlet port, prior to its axial flow through the discharge tube, thereby generating a high degree of turbulence and resulting in a substantially even distribution of gas throughout the discharge portion of the discharge tube.

3. A laser head according to claim 2, wherein the cathode associated with each discharge tube is within the flow of the inlet gas, just upstream of the input port and positioned to be surrounded by the gas as it flows toward the input port.

4. The laser head of claim 1, further including:

an alignment plate and plate adjustment means for adjusting the orientation of the plate on two axes, the plate having a central opening through which the laser beam passes, three fixed, non-adjustable projections extending from the alignment plate, from the side opposite the side facing the housing, a1 mirror having a precision formed flat front surface, a generally central portion of which is reflective and an outer portion of which is a bare substrate, the bare substrate being in contact with the three fixed projections of the alignment plate to hold the mirror in proper alignment, a chiller plate in heat-conductive contact with a back surface of the mirror, a spring plunger member in heat-conductive engagement with the chiller plate and biasing it toward the mirror to urge the mirror against the fixed projections of the alignment plate, a mirror housing encasing the mirror, the chiller plate and the spring plunger, and against which the spring plunger acts, and securing means for connecting the mirror housing to the laser head, heating conducting means between the spring plunger and the mirror housing for effecting good heat conduction between them, and cooling means for drawing heat away from the mirror housing, which in turn draws heat from the spring plunger, which receives heat from the chiller plate transferred from the mirror.

5. The laser head of claim 1, further including a mirror mounting system the laser head including a housing, comprising:

an alignment plate and plate adjustment means for adjusting the orientation of the plate on two axes, the plate having a central opening through which the laser beam passes, three fixed, non-adjustable projections extending from the alignment plate, from the opposite side from the side facing the housing, a mirror member having a precision formed flat front surface, a generally central portion of which is coated with a reflective coating and an outer portion of which is uncoated as a bare substrate, the bare substrate being in contact with the three fixed projections of the alignment plate to hold the mirror in proper alignment, and removable means connected to this housing for urging the mirror member against the non-adjustable projections to maintain alignment of the mirror as established by the plate adjustment means, whereby the mirror member may be removed from contact with the non-adjustable projections for maintenance and replaced with the same or a different mirror member without affecting mirror adjustment, which is established by the plate adjustment means through the alignment plate and the non-adjustable projections.

6. The laser head of claim 1, wherein the resonator cavity stabilization means comprises a resonator support structure for achieving near-zero longitudinal thermal expansion of the resonator cavity with changes in temperature, including a plurality of graphite fiber/resin composite members extending longitudinally with respect to the resonator cavity and in parallel relationship with each other, said cavity including a tube assembly which comprises a rigid tube of larger diameter than the graphite fiber/resin composite member, surrounding each composite member, each rigid tube being of sufficient diameter to impart torsional stability and flexure strength to the assembly of tubes and composite members, a plurality of spacer members extending transversely between and connected fixedly to the rigid tubes, for fixing the tubes with respect to one another and for imparting further stability to the assembly, and end fitting means at each end of each composite member, for connection to a mirror mounting assembly at each end.

7. A mirror mounting system for a laser resonator cavity, the laser including a housing, comprising:

an alignment plate and plate adjustment means for adjusting the orientation of the plate on two axes, the plate having a central opening through which the laser beam passes, three fixed, non-adjustable projections extending from the alignment plate, from the opposite side from the side facing the housing, a mirror member having a precision formed flat front surface, a generally central portion of which is coated with a reflective coating and an outer portion of which is uncoated as a bare substrate, the bare substrate being in contact with the three fixed projections of the alignment plate to hold the mirror in proper alignment, a chiller plate in contact with a back surface of the mirror, with heat-conductive means between the chiller plate and the mirror for effecting good heat conduction between them, a spring plunger member in engagement with the chiller plate and biasing it toward the mirror to urge the mirror against the fixed projections of the alignment plate, and including heat conducting means between the spring plunger and the chiller plate for effecting good heat conduction between them, a mirror housing encasing the mirror, the chiller plate and the spring plunger, and against which the spring plunger acts, and securing means for connecting the mirror housing to the laser head, heat conducting means between the spring plunger and the mirror housing for effecting good heat conduction between them, and cooling means for drawing heat away from the mirror housing, which in turn draws heat from the spring plunger, which receives heat from the chiller plate transferred from the mirror.

8. A mirror mounting system according to claim 7, wherein the heat conducting means between the chiller plate and the spring plunger comprises a generally spherical cavity formed in the back side of the chiller plate and a complementarily shaped tip on the spring plunger, engaged in the spherical recess.

9. In a laser having a resonator cavity defined by a plurality of mirrors, a resonator support structure for achieving near-zero longitudinal thermal expansion of the resonator cavity with changes in temperature, comprising:

a plurality of graphite fiber/resin composite members extending longitudinally with respect to the resonator cavity and in parallel relationship with each other, said cavity including a tube assembly which comprises a rigid tube of larger diameter than the graphite fiber/resin composite member, surrounding each composite member, each rigid tube being of sufficient diameter to impart torsional stability and flexure strength to the assembly of tubes and composite members, a plurality of spacer members extending transversely between and connected fixedly to the rigid tubes, for fixing the tubes with respect to one another and for imparting further stability to the assembly, end fitting means at each end of each composite member, for connection to a mirror mounting assembly at each end, and means within the rigid tubes and engaging the exteriors of the composite members for maintaining the composite members in desired position within the rigid tubes while permitting slight relative longitudinal movement between the composite member and the rigid tube during differential thermal expansion.

10. A resonator support structure for a laser in accordance with claim 9, wherein the graphite fiber/resin composite members are hollow tubes.

11. A resonator support structure for a laser in accordance with claim 9, wherein the graphite fiber/resin composite members have a majority of graphite fibers oriented in a longitudinal direction.

12. A resonator support structure for a laser in accordance with claim 9, wherein the means securing the composite members in position within the rigid tubes comprise a rigid pinned connection located centrally on each rigid tube, fixing the composite member to the rigid tube at that central location, and a plurality of elastomer rings formed around the composite member and engaging the inside of the rigid tube, holding the composite member generally centrally within the cross section of the rigid tube while permitting slight relative longitudinal movement between the composite member and the rigid tube.

13. In a laser head for a carbon dioxide laser of the fast axial flow type, including a plurality of discharge tubes lying in passes of a folded-beam resonator cavity, an improved gas inlet for each discharge tube, for achieving substantially even distribution of gas throughout the discharge portion of the discharge tube, comprising a generally circular transverse inlet bore through the wall of the tube, the tube in the vicinity of the inlet port being surrounded by an enshrouding gas inlet envelope which receives the gas and delivers it at high velocity through the inlet port, so that the gas is forced at high velocity against the opposite wall of the discharge tube, causing high turbulence and effecting substantially even distribution of the gas in the discharge tube.

* * * * *